(12) United States Patent
Gies et al.

(10) Patent No.: US 6,658,360 B1
(45) Date of Patent: Dec. 2, 2003

(54) SOFTWARE-CONTROLLED EVALUATION OF FAULT CURRENTS FOR PROTECTION AND MONITORING SYSTEMS

(75) Inventors: Stefan Gies, Regensburg (DE); Reinhard Schmid, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 59 days.

(21) Appl. No.: 09/590,098

(22) Filed: Jun. 9, 2000

(51) Int. Cl.$^7$ .................................................. G06F 9/00
(52) U.S. Cl. ........................... 702/58; 702/65; 702/71; 702/79; 702/185
(58) Field of Search .................... 702/58, 65, 71, 702/79, 117, 118, 119, 123, 126, 183, 185, 187, 188, 193, 189; 361/42, 86, 87, 93.1; 324/552

(56) References Cited

U.S. PATENT DOCUMENTS

| | | | | |
|---|---|---|---|---|
| 5,512,832 A | * | 4/1996 | Russell et al. | 324/522 |
| 6,088,205 A | * | 7/2000 | Neiger et al. | 361/42 |
| 6,128,169 A | * | 10/2000 | Neiger et al. | 361/42 |
| 6,262,871 B1 | * | 7/2001 | Nemir et al. | 361/42 |
| 6,275,864 B1 | * | 8/2001 | Mancusi et al. | 709/250 |

FOREIGN PATENT DOCUMENTS

DE 196 34 438 A1 3/1998

* cited by examiner

Primary Examiner—Marc S. Hoff
Assistant Examiner—Felix Suarez
(74) Attorney, Agent, or Firm—Sughrue Mion, PLLC

(57) ABSTRACT

A fault current detection system is provided. The detection system detects a fault current generated on a conductive path supplying power to an electric device and prevents the fault current from being supplied to the electric device. In particular, the detection system contains a detector, a switch, and a controller. The detector detects a fault current generated on the conductive path and outputs a corresponding detection signal. The controller inputs the detection signal and determines predetermined characteristics of the fault current based on said detection signal. Then, the controller identifies the fault current as a first type of fault current based on the predetermined characteristics and sets a trigger current to a first trigger current value when the fault current is identified as the first type of fault current. Also, the controller outputs a control signal to the switch to instruct the switch to isolate the electric device from the conductive network when the fault current is greater than the trigger current. In addition, a software program performed by the fault current detection system is also provided.

54 Claims, 8 Drawing Sheets

SOFTWARE-CONTROLLED EVALUATION OF FAULT CURRENTS FOR PROTECTION AND MONITORING SYSTEMS

FIELD OF THE INVENTION

The present invention relates to a fault current detection system. More particularly, the present invention relates to a fault current detection system that is implemented via software and relates to a method employed by the detection system.

BACKGROUND OF THE INVENTION

In many applications, electrical currents are supplied to one or more electric devices to provide power for the devices. For example, electrical currents are supplied from a power company to one or more electrical outlets in a residential home, and a user can connect an electric device to an outlet to supply power to the device. If the electric device malfunctions or is mishandled by the user, a potentially dangerous situation may arise. For example, if the user contacts a portion of the electric device that receives electrical currents from the power company, the electrical current will pass through the user to the ground and may cause the user's heart to suffer from a cardiac arrest. Also, if the portion of the electric device that receives electrical currents is improperly grounded due to faulty insulation, a current will be supplied to the electric device and may start a fire in the user's home. The additional surge of current that is supplied to the user's home when the electric device malfunctions or is mishandled is known as a fault current.

In order to prevent fire in the user's home or to prevent the user from being harmed, a circuit breaker has been developed that detects fault currents and that blocks the supply of electrical current to the one or more electrical outlets in the user's home if the detected fault currents exceed certain levels. FIG. 7 shows an example of such a circuit breaker 1 that comprises a sum-current transformer 2, a power supply 4, a triggering circuit 5, a triggering relay 6, a switching mechanism 7, and a switch 8.

The electric currents are supplied from the power company to the user's home via a conductor network LN, and the network LN includes three active conductors $L_1$, $L_2$, and $L_3$ and a neutral or ground conductor N. The conductor network LN is wrapped around a core 3 of the sum-current transformer 2 to form a primary winding N1 of the transformer 2. Also, a secondary winding. N2 is wrapped around the core 3 of the transformer 2, and the triggering circuit 5 is connected to the winding N2. Specifically, the triggering circuit 5 is connected across the output terminals of the winding N2, and the triggering relay 6 is connected across the output terminals of the circuit 5. The triggering relay 6 controls the switching mechanism 7 to selectively open and close the switch 8, and the switch 8 is provided in the path of the conductor network LN between the power company and the electrical device.

When the electrical device in the user's home is operating or being handled under normal conditions, no fault currents exist. As a result, the vector sum of the currents flowing through the core 3 via the conductor network LN is zero. However, if a fault current If is generated, the vector sum of the currents is not zero, and a voltage $U_e$ is generated across the secondary winding N2. The characteristics of the voltage $U_e$ correspond to the characteristics of the fault current $I_f$, and the triggering circuit 5 generates an output voltage $U_a$ based on the input voltage $U_e$. The output voltage $U_a$ causes a current $I_a$ to flow through the triggering relay 6, and the relay 6 triggers. The triggering of the relay 6 causes the switching mechanism 7 to open the switch 8 and block the supply of current from the power company to at least one outlet in the user's home. Accordingly, when the user contacts a conductive portion of an electric device connected to an outlet and causes a fault current $I_f$ to be generated, the relay 6 triggers, and the switching mechanism 7 opens the switch 8. As a result, the dangerous fault current If is no longer supplied to the user's home and will not harm the user.

The value of a triggering fault current $I_{\Delta trigger}$ of the circuit breaker 1 (i.e. the value of a fault current If that will trigger the relay 6) is determined based on the rated residual current (or nominal fault current) $I_{\Delta n}$. The nominal fault current $I_{\Delta n}$ corresponds to the sensitivity of the circuit breaker 1 and is selected based on the electrical standards of the electrical system in which the circuit breaker 1 is incorporated. An example of how the triggering current $I_{\Delta trigger}$ is selected will be described below in conjunction with the graph illustrated in FIG. 8.

The graph shows an example of a fibrillation limit curve G1 and a fire prevention limit curve G2. The fibrillation limit curve G1 represents the maximum value of the fault current If that will not cause a user's heart to fibrillate if the user contacts the current If, and the values in the curve G1 are,dependent upon the frequency of the fault current If. For example, if the fault current If has a frequency of 100 Hz and is less than or equal to about 30 mA, the user will not suffer ventricular fibrillation, but if the fault current $I_f$ is greater than approximately 30 mA, the user will experience fibrillation. On the other hand, if the fault current $I_f$ has a frequency of 1 kHz, the user's heart will not fibrillate if the current $I_f$ is less than or equal to approximately 420 mA but will fibrillate if the current $I_f$ is greater than such value.

While the maximum current values in the fibrillation limit curve G1 are dependent on the frequency of the fault current $I_f$, the maximum current values represented by the fire prevention limit curve G2 are not frequency dependent. In particular, if the value of the fault current $I_f$ (at any frequency) is less than or equal to approximately 420 mA, a fire will not occur in the user's electric device or home, but if the value is greater than 420 mA, a fire will likely occur. In the present example, the current value of 420 mA is selected for a power system with a voltage of 230 V (with respect to ground) in order to prevent a power dissipation that is greater than 100 Watts at the location of the fault.

As indicated above, the specific values and characteristics of the limit curves G1 and G2 are governed by the electrical standards of a particular electrical system. For example, the limit curve G1 is determined according to the international standard IEC 479. If the circuit breaker 1 were operating according to different standards, the specific values of the curves G1 and G2 would be different.

The triggering fault current $I_{\Delta trigger}$, which causes the circuit breaker 1 to trip, should be selected based on both the fibrillation limit curve G1 and fire prevention limit curve G2 on the graph shown in FIG. 8. Specifically, the triggering fault current $I_{\Delta trigger}$ should be selected such that, when a fault current $I_f$ occurs, the circuit breaker 1 will trigger before the fault current $I_f$ rises to a level that can cause injury to the user of an electric device or to a level that can cause a fire. Therefore, if the circuit breaker 1 is operating in an environment in which fault currents having low frequencies may be generated, the triggering fault current $I_{\Delta trigger}$ may be set to a value that is below the fibrillation limit curve G1 at low frequencies. In the example shown in FIG. 8, the triggering fault current $I_{Atrigger}$ would be less than approximately 30 mA if harmful fault currents $I_f$ having frequencies of 50 Hz may possibly be generated. However, as shown in FIG. 8, the maximum values of the limit curve G1 significantly increase as the frequency of the fault currents $I_f$ increases.

In addition, several types of fault currents $I_f$ may occur that can cause harm to a user of an electric device or than can cause a fire in the user's home. The different types of fault currents include an alternating fault current, a pulsating direct fault current, and a smooth direct fault current.

An alternating fault current occurs when the fault current $I_f$ is an alternating signal and the magnitude of negative amplitude of the input signal is distorted with respect to the positive amplitude of the input signal. A smooth direct fault current occurs when the magnitude of the negative amplitude or the magnitude of the positive amplitude of the fault current $I_f$ falls within a certain range of values around the effective value of the fault current $I_f$. A pulsating direct fault current occurs when the magnitude of the negative amplitude or the magnitude of the positive amplitude falls outside the certain range of values around the effective value of the fault current $I_f$.

Accordingly, the circuit breaker 1 should ideally detect whether or not a fault current $I_f$ has occurred, what type of fault current $I_f$ has occurred, and whether or not the particular type of fault current $I_f$ is severe. Whenever a particular type of fault current $I_f$ is severe, the circuit breaker 1 should ideally trip to prevent electric power from being supplied to the user's electric device.

Although the above-described circuit breaker 1 detects fault currents $I_f$ and blocks the supply of power to the electric device in some instances, it is implemented via analog or digital hardware. Therefore, designing the circuit breaker 1 so that it adequately detects fault currents $I_f$, distinguishes the detected fault currents $I_f$ from among multiple types of fault currents $I_f$, and determines the severity of the detected fault currents $I_f$, is extremely complex, if not impossible. Furthermore, since the design of the circuit breaker 1 has a complex hardware design, it has to be custom-made for each specific application and standard under which it is to operate. Accordingly, mass-producing the circuit breaker 1 is virtually impossible, and modifying the design of the circuit breaker 1 is very difficult.

In addition, many electrical components that are connected to the conductor network LN typically generate brief, transient leakage currents that are supplied to the electric device for a relatively short period of time. When such transient leakage currents are generated, they will not damage the electric device in the user's home or cause a fire. However, since the circuit breaker 1 is implemented via hardware, it cannot easily distinguish between harmless transient leakage currents having short durations and damaging fault currents having longer durations. As a result, the leakage currents often cause the circuit breaker 1 to trip and unnecessarily prevent electric power from being supplied to the electric device. Accordingly, the operational efficiency of the electric device is substantially degraded.

SUMMARY OF THE INVENTION

One object of the present invention is to provide a fault current detection system that can detect fault currents, distinguish the detected fault currents from among multiple types of fault currents, determine the severity of the detected fault currents, and determine the frequencies of the different fault currents. A related object is to provide such a fault detection system that is capable of detecting these parameters more accurately than possible heretofore.

Another object of the present invention is to provide a fault current detection system that can be easily mass-produced and that can be easily modified to work in many different environments.

Still another object of the present invention is to provide a fault current detection system that can easily distinguish between harmless transient leakage currents having short durations and damaging fault currents having longer durations.

In order to achieve the above and other objects, a fault current detection software program is provided. The software program is contained in a computer readable medium and includes instructions to perform a routine comprising: (a) determining predetermined characteristics of said fault current based on a detection signal corresponding to said fault current; (b) identifying said fault current as a first type of fault current when at least one of said predetermined characteristics has a first predetermined value; (c) setting a trigger current to a first trigger current value when said fault current is identified as said first type of fault current; and (d) outputting a control signal when said fault current and said trigger current have a predetermined relationship.

In order to further achieve the above and other objects, another fault current detection software program is provided. This software program is also contained in a computer readable medium and includes instructions to perform a routine comprising: (a) determining at least a frequency of said fault current based on a detection signal corresponding to a fault current; (b) determining if said frequency of said fault current is greater than a first predetermined frequency; (c) identifying said fault current as a high frequency fault current when said frequency is greater than or equal to said first predetermined frequency; and (d) when said frequency is less than said first predetermined frequency, identifying said fault current as a waveform fault current.

In order to still further achieve the above and other objects, a fault current detection system is provided. The detection system detects a fault current generated on a conductive path supplying power to an electric device and prevents the fault current from being supplied to the electric device. The fault current detection system comprises: a detector that detects a fault current generated on said conductive path and outputs a corresponding detection signal; a switch that is provided in said conductive path that selectively isolates said electric device from said conductive path corresponding to a fault current; and a controller that inputs said detection signal and determines predetermined characteristics of said fault current based on said detection signal, wherein said controller identifies said fault current as a first type of fault current when at least one of said predetermined characteristics has a first predetermined value, wherein said controller sets a trigger current to a first trigger current value when said fault current is identified as said first type of fault current, and wherein said controller outputs a control signal to said switch to instruct said switch to isolate said electric device from said conductive network when said fault current and said trigger current have a predetermined relationship.

In order to even further achieve the above and other objects, another fault current detection system is provided. The detection system detects a fault current generated on a conductive path supplying power to an electric device and prevents the fault current from being supplied to the electric device. The fault current detection system comprises: a detector that detects a fault current generated on said conductive path and outputs a corresponding detection signal; a switch that is provided in said conductive path that selectively isolates said electric device from said conductive path corresponding to a fault current; and a controller that inputs said detection signal and determines at least a frequency of said fault current based on said detection signal, and wherein said controller determines if said frequency of said fault current is greater than a first predetermined frequency, wherein said controller identifies said fault current as a high frequency fault current when said frequency is greater than or equal to said first predetermined frequency, wherein, when said frequency is less than said first predetermined frequency, said controller identifies said fault current as a waveform fault current.

BRIEF DESCRIPTION OF THE DRAWINGS

The above and other objectives and advantages of the present invention will become more apparent by describing in detail preferred embodiments thereof with reference to the attached drawings in which.

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that are known to one skilled in the art are omitted for the sake of clarity and brevity.

Figure 1:
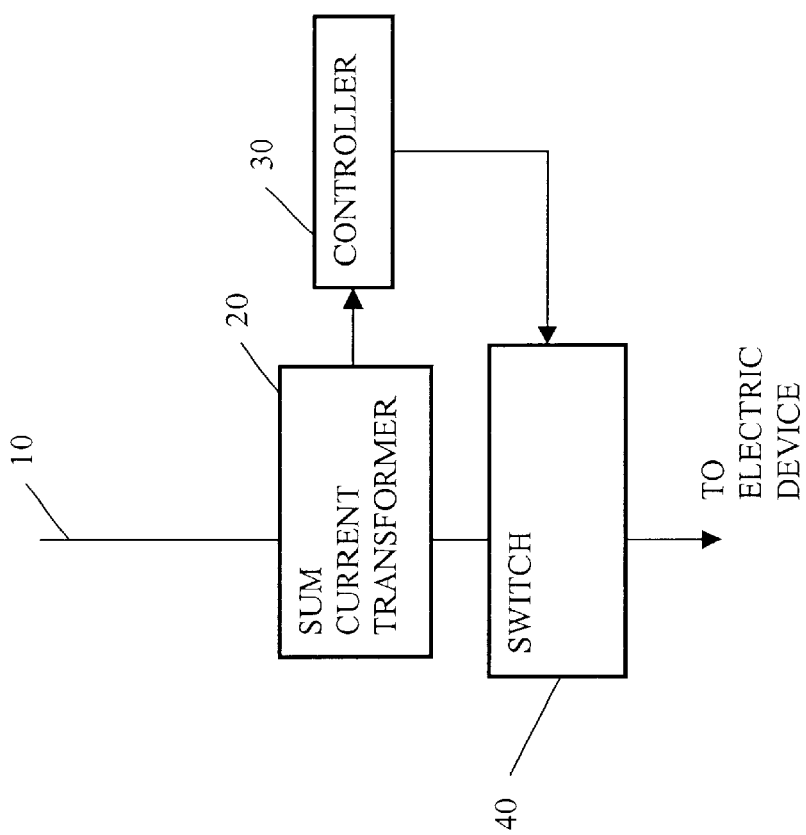
FIG. 1 is a block diagram of the structure of a fault current detection system according to an illustrative embodiment of the present invention.
Figure 7:
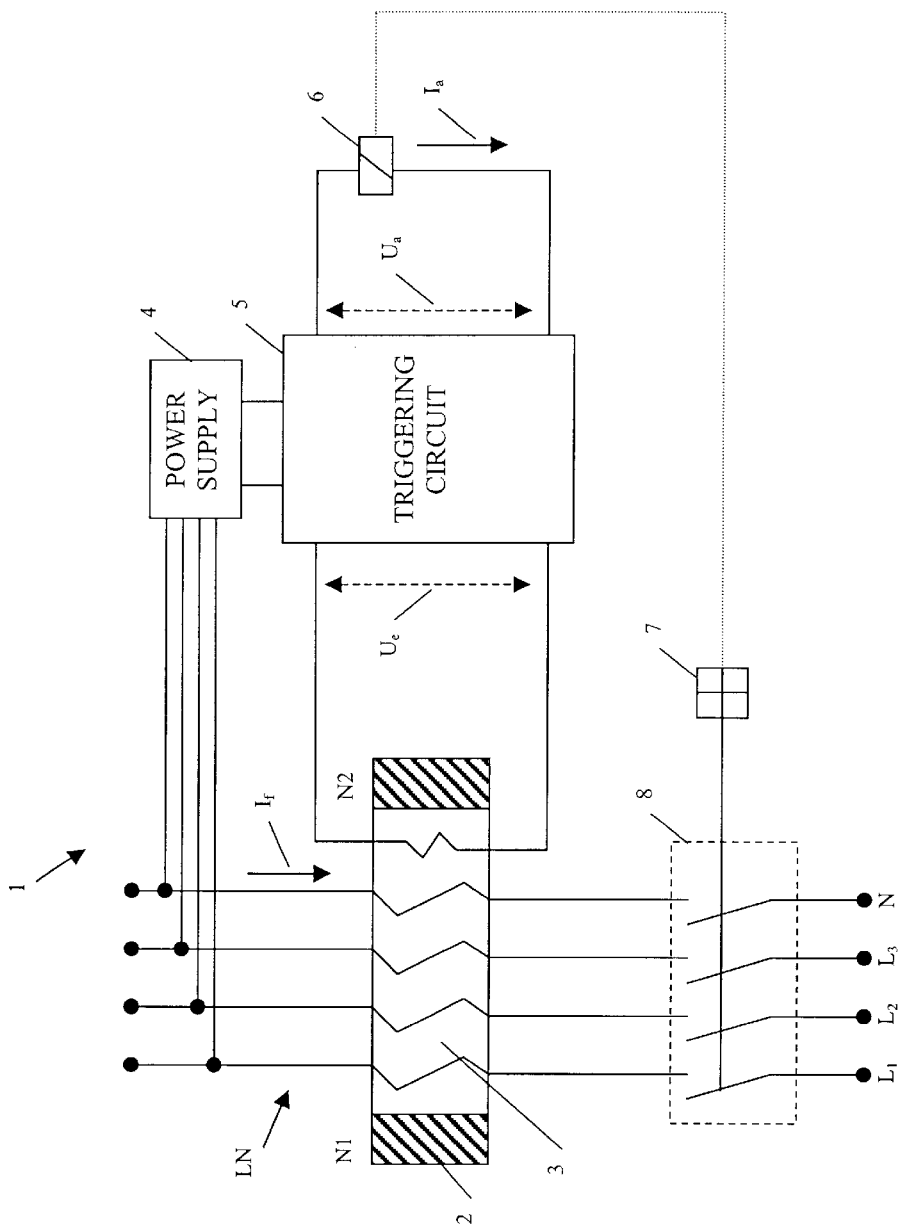
FIG. 7 is a block diagram of a circuit breaker that is implemented via hardware and that prevents power from being supplied to an electric device when a fault current is detected.

An example of the structure of a fault current detection system in accordance with an illustrative embodiment of the present invention is shown in FIG. 1. As shown in the figure, the system comprises a sum current transformer 20, a controller 30, and a switch 40. A conductor network 10 forms a primary winding of the sum current transformer 20 and is connected to an electric device via the switch 40. The configuration of and interconnections among the conductor network 10, sum current transformer 20, and switch 40 are preferably similar to those of the corresponding components shown in FIG. 7 and will not be discussed in greater detail for the sake of brevity.

The controller 30 receives a detection signal from the sum current transformer 20, and the detection signal corresponds to a fault current $I_f$ that has been generated on the conductor network 10. Based on the detection signal, the controller 30 determines what type of fault current exists and the severity of the fault current. Then, the controller 30 outputs a control signal to the switch 40 to instruct the switch 40 to block the supply of the fault current $I_f$ to the electric device, if necessary.

The operation of the controller 30 is controlled via a software program. The software program may be supplied to the controller 30 via a read only memory ("ROM"), a random access memory ("RAM"), a floppy disk, a hard disk, an optical disk, a carrier wave (e.g. a carrier wave transmitted via the internet, a vertical blanking interval of a television signal, etc.), or any other computer readable medium. An illustrative embodiment of the routines of the software program executed by the controller 30 is shown in the flow charts in FIGS. 2–6.

Figure 2:
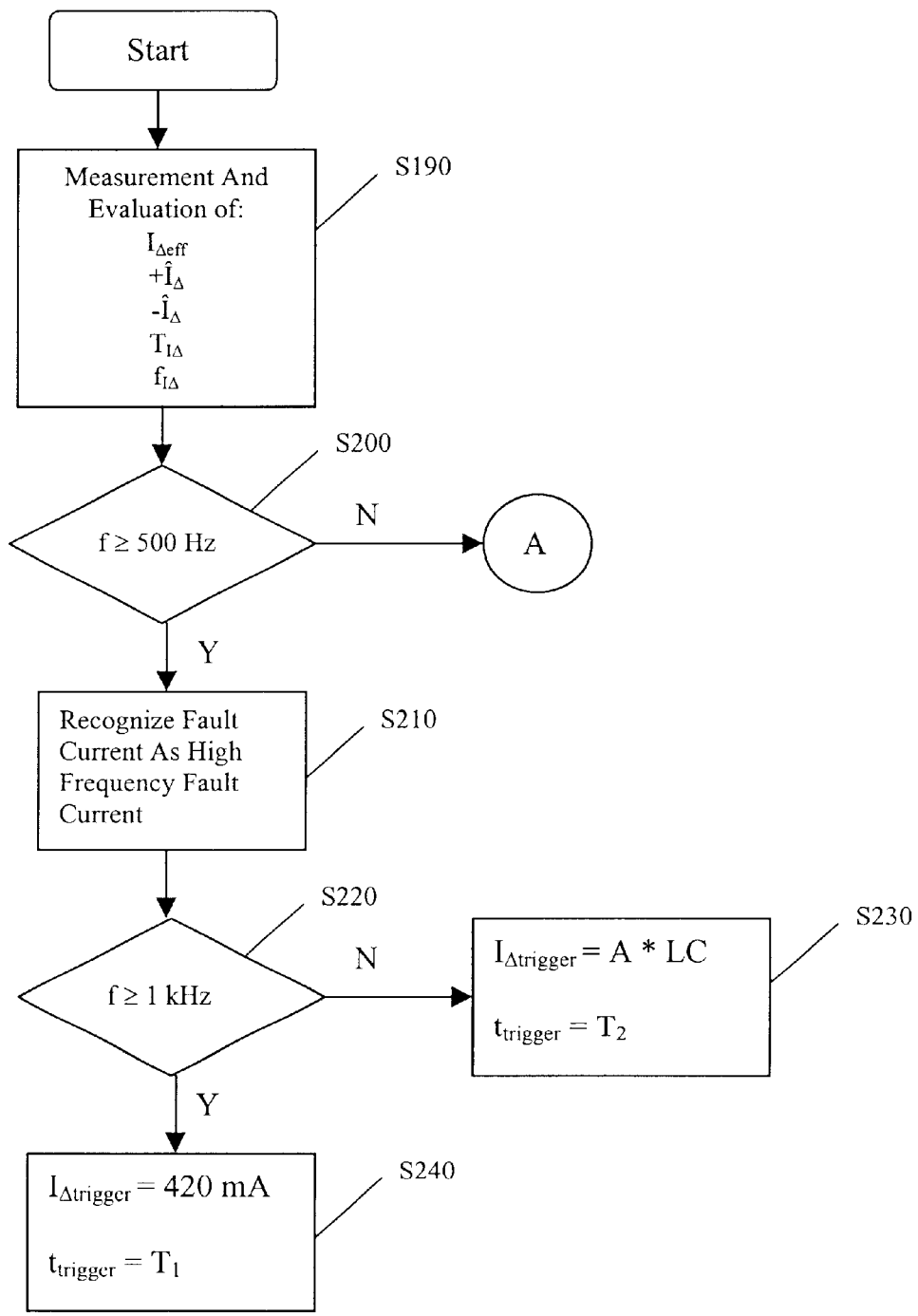
FIG. 2 is a flow chart of an illustrative process that determines if a fault current is a high frequency fault current and that is performed by the fault current detection system of the illustrative embodiment of the present invention.

As shown in FIG. 2, the controller 30 generates an image of the fault current $I_f$ as a function of time. The image of the fault current $I_f$ may be determined by continually measuring the value of the fault current $I_f$ as a continuous function of time or may be determined by measuring the value of the fault current at discrete points of time. Once the image of the fault current $I_f$ is determined, the controller 30 calculates one or more of the following values (step S190):

$I_{\Delta eff}$: The effective value of the fault current
−Î: The amplitude of the negative half-wave of the fault current, if present
+Î: The amplitude of the positive half-wave of the fault current, if present
T: The period of the fault current
f: The frequency of the fault current Also, the frequency f of the fault current $I_f$ may be measured directly from the image of the fault current $I_f$. On the other hand, the period T of the fault current $I_f$ may be measured, and the frequency f of the fault current $I_f$ may be calculated from the period T. Suitable algorithms for determining the above values are well known to one skilled in the art upon reading the specification, and therefore, they will not be described for the sake of brevity.

After the above values are determined, the controller 30 determines if the frequency f of the fault current $I_f$ is greater than or equal to a threshold frequency (e.g. 500 Hz) (step S200). If the frequency f is greater than or equal to 500 Hz, the controller 30 concludes that the fault current $I_f$ is a high frequency fault current that may cause ventricular fibrillation in a user or a fire in the electrical system (step S210). An example of the various frequencies and values of fault currents $I_f$ that will cause ventricular fibrillation and fire was previously discussed in conjunction with FIG. 8. Furthermore, the value of the threshold frequency is not limited to 500 Hz and will depend upon the specific characteristics and the particular application in which the detection system is used.

Figure 8:
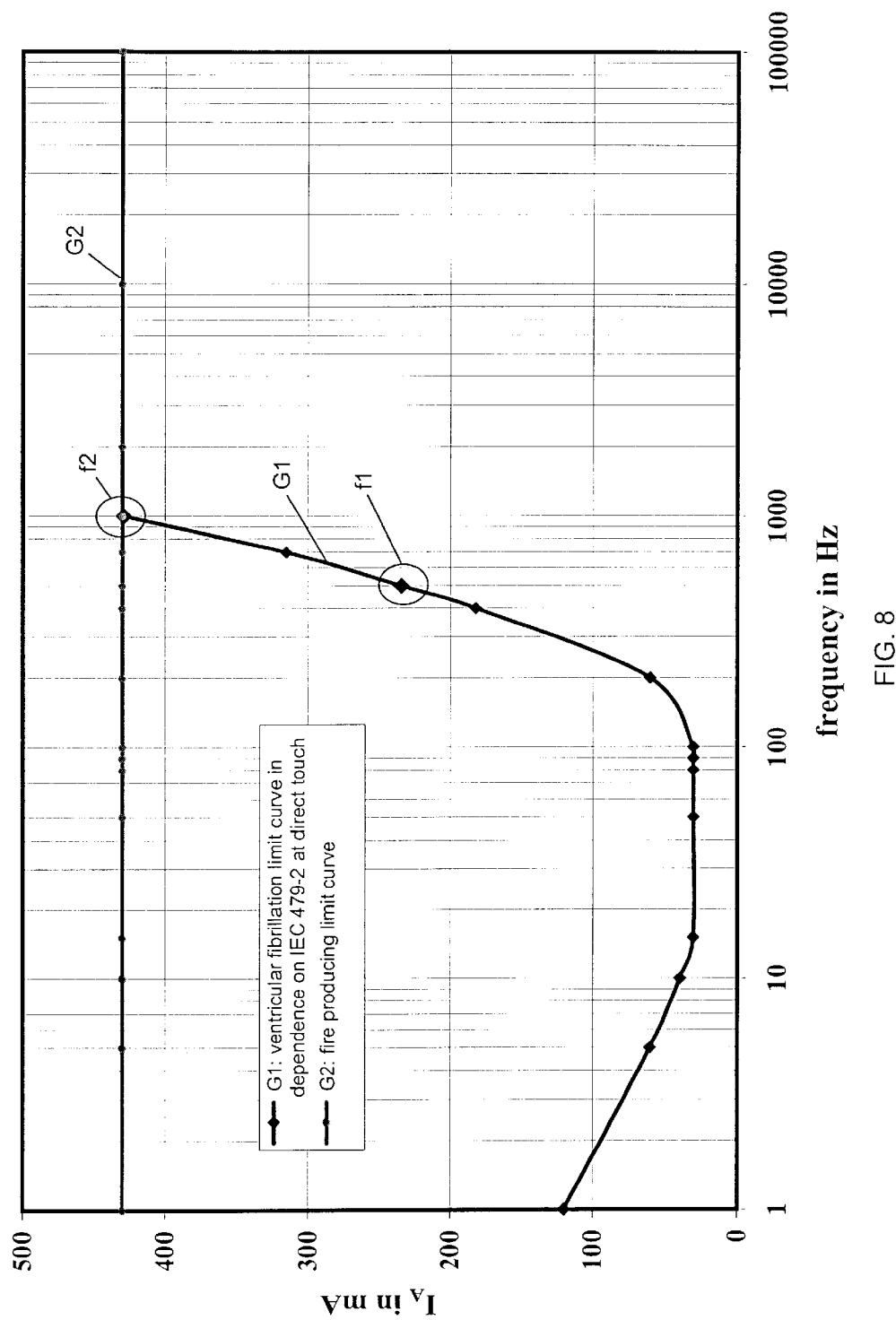
FIG. 8 is a graphical illustration of an example of a fibrillation limit curve and a fire prevention limit curve.

After recognizing that the fault current $I_f$ is a high frequency fault current, the controller 30 determines if the frequency f of the fault current is less than 1 kHz (step S220). If the frequency f is less than 1 kHz (and greater than 500 Hz), the controller 30 determines that the value of the fault current $I_f$ cannot exceed the fibrillation limit curve G1 shown in FIG. 8. Specifically, if th e frequency f of the fault current $I_f$ has a value between 500 Hz and 1 kHz, the fault current $I_f$ will not cause ventricular fibrillation or a fire if the value of the current $I_f$ falls below the fibrillation limit curve G1. Accordingly, the controller 30 sets the trigger current $I_{\Delta trigger}$ based on the fibrillation limit curve G1 and sets the trigger time $t_{\Delta trigger}$ according to specific applications and standards (step S230). If the fault current $I_f$ exceeds the trigger current $I_{\Delta trigger}$ for a period of time that is greater than or equal to the trigger time $t_{\Delta trigger}$, the controller 30 outputs the control signal to instruct the switch 40 to block the supply of electric power to the electric device. The trigger current $I_{\Delta trigger}$ is determined preferably based on the following equation:

$$I_{\Delta trigger} = A * LC \tag{1}$$

where A is a parameter that equals a value between 0.5 and 1.0 and LC represents the fibrillation limit curve G1 shown in FIG. 8. Thus, as shown in FIG. 8, if the frequency f of the fault current $I_f$ equals 600 Hz, the trigger current $I_{\Delta trigger}$ would equal approximately A * 280 mA. Also, the trigger time $t_{\Delta trigger}$ is set equal to a parameter $T_2$ that is determined by the specific application and characteristics of the fault current detection system. In the specific example, the trigger time $t_{\Delta trigger}$ equals between 10 ms and 300 ms.

On the other hand, if the frequency f of the fault current $I_f$ is determined to be greater than or equal to 1 kHz in step 220, the controller 30 determines that the value of the fault current $I_f$ cannot exceed the fire prevention limit curve G2 shown in FIG. 8. In particular, if the frequency of the fault current $I_f$ has a value greater than or equal to 1 kHz, the fault current $I_f$ will not cause ventricular fibrillation or a fire if the value of the current $I_f$ falls below the fire prevention limit curve G2. Accordingly, the controller 30 sets the trigger current $I_{\Delta trigger}$ based on the limit curve G2 and sets the trigger time $t_{\Delta trigger}$ according to specific applications and standards (step S240). In the present embodiment, since a fire will not occur (and ventricular fibrillation will not occur) as long as the fault current $I_f$ is less than approximately 420 mA for frequencies above 1 kHz, the controller 30 sets the trigger current $I_{\Delta trigger}$ equal to 420 mA. Also, in the present embodiment, the trigger time $t_{\Delta trigger}$ is set to a parameter $T_1$, which preferably equals a value between 50 ms and 500 ms.

Figure 3:
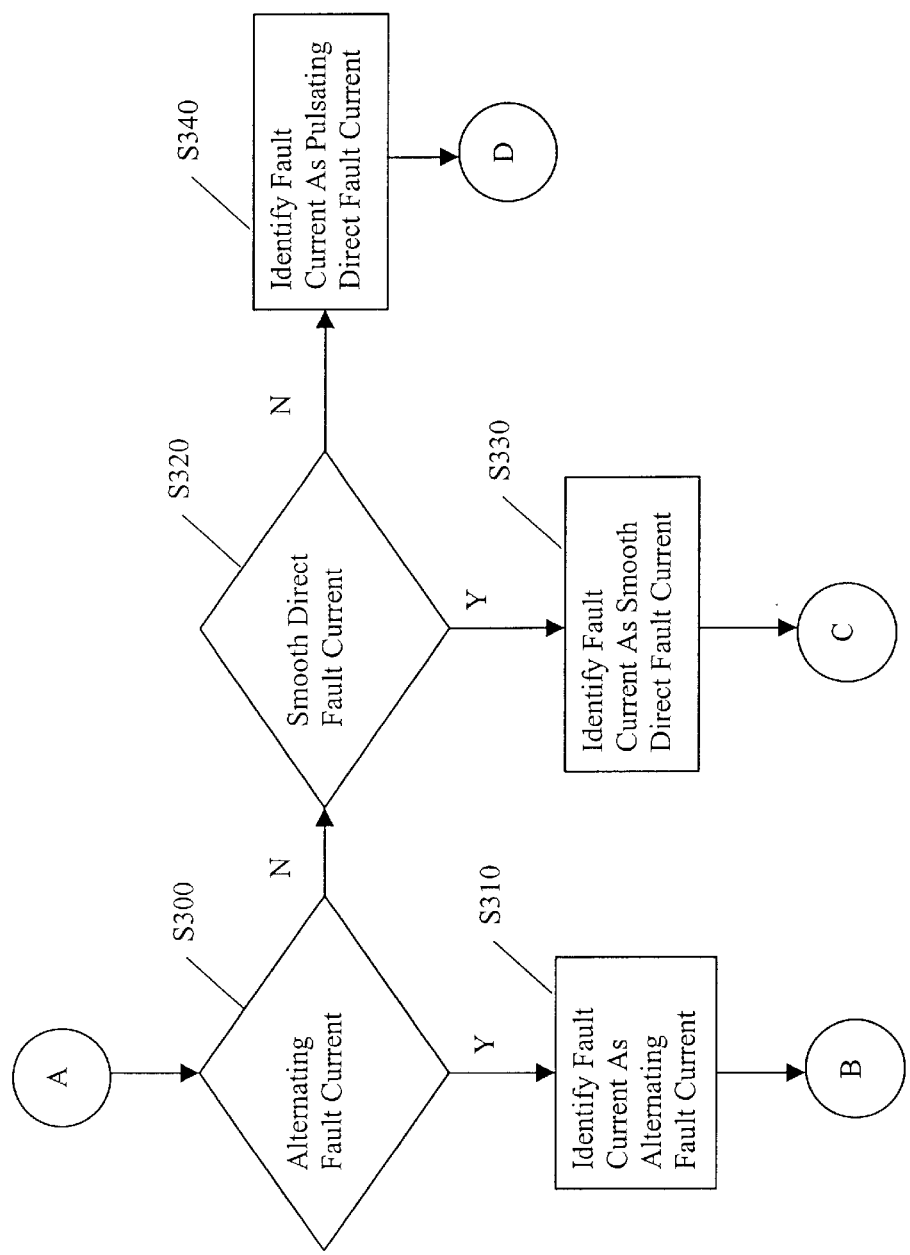
FIG. 3 is a flow chart of an illustrative process that determines what type of fault current has been generated and that is performed by the fault current detection system of the illustrative embodiment of the present invention.

In step S200, if the frequency f of the fault current $I_f$ is less than 500 Hz, the controller 30 identifies the type of the fault current $I_f$ according to the procedure shown in FIG. 3. In particular, the controller 30 determines whether or not the fault current is an alternating fault current (step S300). The fault current is considered to be an alternating fault current if the magnitude of the negative amplitude $-\hat{I}$ of the fault current $I_f$ is greater than or equal to a predetermined fraction Z of the magnitude of the positive amplitude $+\hat{I}$ of the fault current $I_f$ when the magnitude of the negative amplitude $-\hat{I}$ is less than or equal to the magnitude of the positive amplitude $+\hat{I}$. In other words, the fault current $I_f$ is considered to be an alternating fault current if the following equation is satisfied:

$$\text{for } |-\hat{I}| \leq |+\hat{I}|: \tag{2}$$
$$|-\hat{I}| \geq Z * |+\hat{I}|$$

The value of the predetermined fraction Z is based on the specific application and characteristics of the fault current detection system, and in the present embodiment, the fraction Z has a value between 0.1 and 0.2.

Furthermore, the fault current $I_f$ is also considered to be an alternating fault current if the magnitude of the positive amplitude $+\hat{I}$ is greater than or equal to the predetermined fraction Z of the magnitude of the negative amplitude $-\hat{I}$ when the magnitude of the negative amplitude $-\hat{I}$ is greater than the magnitude of the positive amplitude $+\hat{I}$. In other words, the fault current $I_f$ is also considered to be an alternating fault current if the following equation is satisfied:

$$\text{for } |-\hat{I}| > |+\hat{I}|: \tag{3}$$
$$|+\hat{I}| \geq Z * |-\hat{I}|$$

Figure 4:
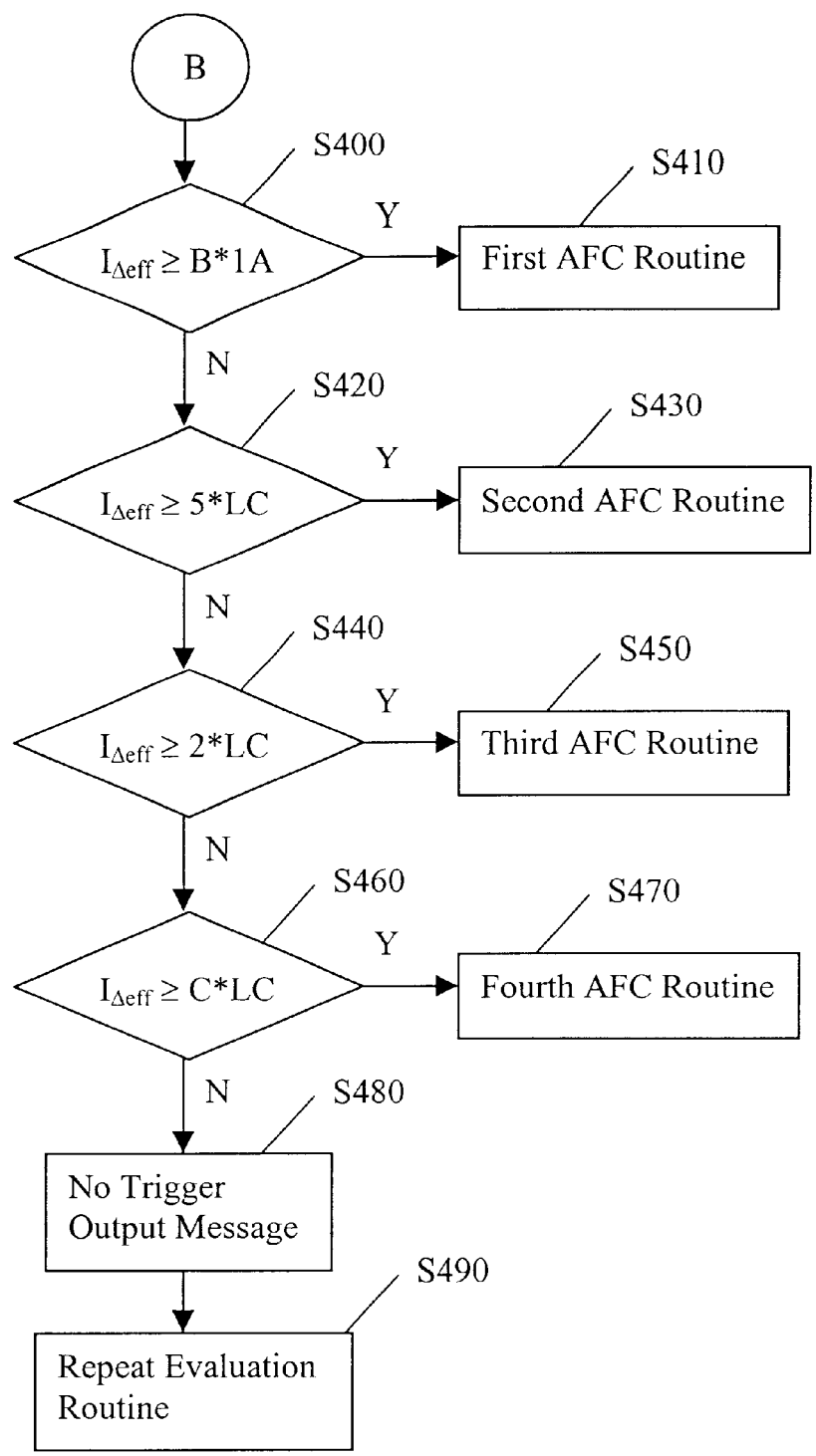
FIG. 4 is a flow chart of an illustrative process that evaluates an alternating fault current and that is performed by the fault current detection system of the illustrative embodiment of the present invention.

If the fault current $I_f$ is determined to be an alternating fault current, the alternating fault current triggering routine shown in FIG. 4 is executed (step S310). As shown in FIG. 4, the controller 30 determines if the effective value $I_{\Delta eff}$ of the fault current $I_f$ satisfies the following relationship:

$$I_{\Delta eff} \geq B * 1 \text{ Ampere} \tag{4}$$

where B is a parameter that has a value between 1 and 500 (step S400). The value of the parameter B is determined based on the specific applications and standards of the environment in which the fault current detection system is used. If the effective value $I_{\Delta eff}$ of the fault current $I_f$ satisfies relationship (4), the controller 30 outputs a control signal to prevent the supply of power to the electric device according to a first alternating fault current ("AFC") triggering routine (i.e. a "500 A" AFC triggering routine) (step S410). In the triggering routine, the triggering current $I_{\Delta trigger}$ and the triggering time $t_{\Delta trigger}$ are determined according to specific applications and standards.

On the other hand, if the effective value $I_{\Delta eff}$ of the fault current $I_f$ does not satisfy relationship (4), the controller 30 determines if the effective value $I_{\Delta eff}$ of the fault current $I_f$ satisfies the following relationship:

$$I_{\Delta eff} \geq 5 * LC \tag{5}$$

where the term LC corresponds to the fibrillation limit curve G1 shown in FIG. 8 (step S420). Specifically, the term LC represents the value of the limit curve G1 at the frequency f of the fault current $I_f$. If the effective value $I_{\Delta eff}$ of the fault current $I_f$ satisfies relationship (5), the controller 30 outputs a control signal to prevent the supply of power to the electric device according to a second AFC triggering routine (i.e. a "5 * LC" AFC triggering routine) (step S430). In the triggering routine, the triggering current $I_{\Delta trigger}$ and the triggering time $t_{\Delta trigger}$ are determined according to specific applications and standards.

However, if the effective value $I_{\Delta eff}$ of the fault current $I_f$ does not satisfy relationship (5), the controller 30 determines if the effective value $I_{\Delta eff}$ of the fault current $I_f$ satisfies the following relationship:

$$I_{\Delta eff} \geq 2 * LC \tag{6}$$

(step S440). If the effective value $I_{\Delta eff}$ of the fault current $I_f$ satisfies relationship (6), the controller 30 outputs a control signal to prevent the supply of power to the electric device according to a third AFC triggering routine (i.e. a "2 * LC" AFC triggering routine) (step S450). In the triggering routine, the triggering current $I_{\Delta trigger}$ and the triggering time $t_{\Delta trigger}$ are determined according to specific applications and standards.

If the effective value $I_{\Delta eff}$ of the fault current $I_f$ does not satisfy relationship (6), the controller 30 determines if the effective value $I_{\Delta eff}$ satisfies the following relationship:

$$I_{\Delta eff} \geq C * LC \qquad (7)$$

where the parameter C equals a value between 0.5 and 1.0 based on the particular operating conditions and application of the fault current protection circuit (step S460). If the effective value $I_{\Delta eff}$ of the fault current $I_f$ satisfies relationship (7), the controller 30 outputs a control signal to prevent the supply of power to the electric device according to a fourth AFC triggering routine (i.e. a "1 * LC" AFC triggering routine) (step S470). In the triggering routine, the triggering current $I_{\Delta trigger}$ and the triggering time $t_{\Delta trigger}$ are determined according to the specific application and characteristics of the fault current detection system.

If the effective value $I_{\Delta eff}$ of the fault current $I_f$ does not satisfy relationship (7), the controller 30 may output a message to inform a user or operator that the fault current detection system has not been activated and may store the effective value $I_{\Delta eff}$ of the fault current $I_f$ (step S480). Then, the controller 30 proceeds to step S190 (FIG. 2) to update the measured values relating to the fault current $I_f$ and performs the remaining steps shown in FIG. 2 (step S490).

If the controller 30 determines that the fault current $I_f$ is not an alternating fault current in step S300 (FIG. 3), the controller 30 determines whether or not the fault current $I_f$ is a smooth direct fault current (step S320). In particular, the controller 30 determines if one of the following conditions is satisfied: (1) the magnitude of the negative amplitude $-\hat{I}$ of the fault current is less than or equal to a multiple Y of the effective value $I_{\Delta eff}$ of the fault current $I_f$ or (2) the magnitude of the positive amplitude $+\hat{I}$ is less than or equal to the multiple Y of the effective value $I_{\Delta eff}$ of the fault current $I_f$. In other words, the controller 30 determines that the fault current $I_f$ is a smooth direct fault current if the following relationship is satisfied:

$$|-\hat{I}| \leq Y * I_{\Delta eff}; \text{ or} \qquad (8)$$

$$|+\hat{I}| \leq Y * I_{\Delta eff}$$

Again, the value of the multiple Y is based on the specific application and characteristics of the fault current detection system, and in the present embodiment, the multiple Y has a value between 1.1 and 1.2.

Figure 5:
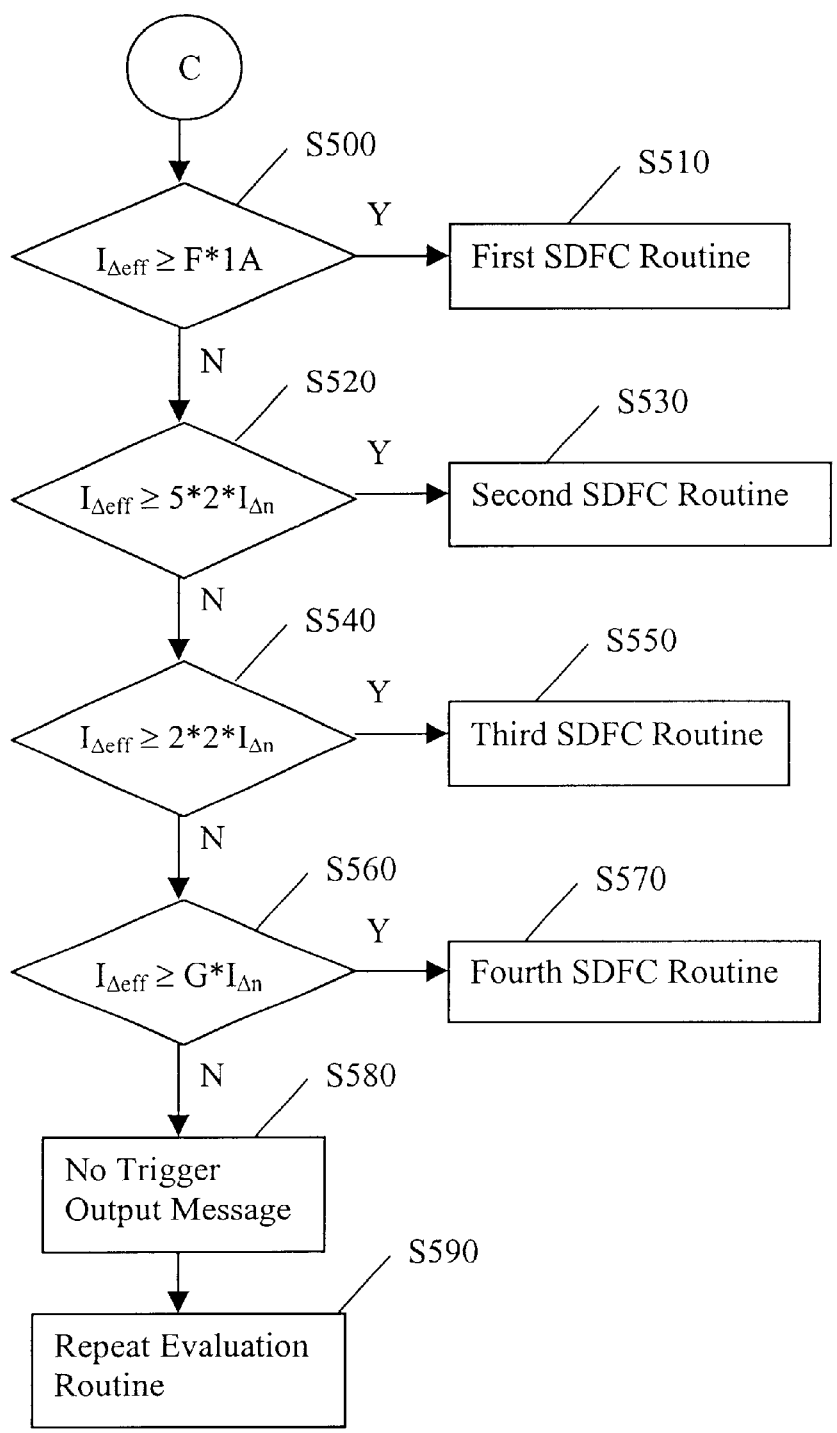
FIG. 5 is a flow chart of an illustrative process that evaluates a smooth direct fault current and that is performed by the fault current detection system of the illustrative embodiment of the present invention.

If the fault current $I_f$ is determined to be smooth direct fault current, the smooth direct fault current triggering routine shown in FIG. 5 is executed (step S330). As shown in FIG. 5, the controller 30 determines if the effective value $I_{\Delta eff}$ of the fault current $I_f$ satisfies the following relationship:

$$I_{\Delta eff} \geq F * 1 \text{ Ampere} \qquad (9)$$

where F is a parameter that has a value between 1 and 500 (step S500). The value of the parameter F is determined based on specific applications and standards. If the effective value $I_{\Delta eff}$ of the fault current $I_f$ satisfies relationship (9), the controller 30 outputs a control signal to prevent the supply of power to the electric device according to a first smooth direct fault current ("SDFC") triggering routine (i.e. a "500 A" SDFC triggering routine) (step S510). In the triggering routine, the triggering current $I_{\Delta trigger}$ and the triggering time $t_{\Delta trigger}$ are determined according to specific applications and standards.

On the other hand, if the effective value $I_{\Delta eff}$ of the fault current $I_f$ does not satisfy relationship (9), the controller 30 determines if the effective value $I_{\Delta eff}$ of the fault current $I_f$ satisfies the following relationship:

$$I_{\Delta eff} \geq 5 * 2 * I_{\Delta n} \qquad (10)$$

where $I_{\Delta n}$ equals the rated residual current (or nominal fault current) of the circuit breaker. The current $I_{\Delta n}$ is equivalent to the value $LC_{f(50)}$, where $LC_{f(50)}$ equals the value of the limit curve G1 at a frequency f that equals 50 Hz. (step S520). If the effective value $I_{\Delta eff}$ of the fault current $I_f$ satisfies relationship (10), the controller 30 outputs a control signal to prevent the supply of power to the electric device according to a second SDFC triggering routine (i.e. a "5 * 2 * $I_{\Delta n}$" SDFC triggering routine) (step S530). In the triggering routine, the triggering current $I_{\Delta trigger}$ and the triggering time $t_{\Delta trigger}$ are determined according to the specific application and characteristics of the fault current detection system.

However, if the effective value $I_{\Delta eff}$ of the fault current $I_f$ does not satisfy relationship (10), the controller 30 determines if the effective value $I_{\Delta eff}$ satisfies the following relationship:

$$I_{\Delta eff} \geq 2 * 2 * I_{\Delta n} \qquad (11)$$

(step S540). If the effective value $I_{\Delta eff}$ of the fault current $I_f$ satisfies relationship (11), the controller 30 outputs a control signal to prevent the supply of power to the electric device according to a third SDFC triggering routine (i.e. a "2 * 2 * $I_{\Delta n}$" SDFC triggering routine) (step S550). In the triggering routine, the triggering current $I_{\Delta trigger}$ and the triggering time $t_{\Delta trigger}$ are determined according to specific applications and standards.

If the effective value $I_{\Delta eff}$ of the fault current $I_f$ does not satisfy relationship (11), the controller 30 determines if the effective value $I_{\Delta eff}$ satisfies the following relationship:

$$I_{\Delta eff} \geq G * I_{\Delta n} \qquad (12)$$

where the parameter G equals a value between 0.5 and 2 and is based on the particular operating conditions and features of the fault current detection system (step S560). If the effective value $I_{\Delta eff}$ of the fault current $I_f$ satisfies relationship (12), the controller 30 outputs a control signal to prevent the supply of power to the electric device according to a fourth SDFC triggering routine (i.e. a "1 * $I_{\Delta n}$" SDFC triggering routine) (step S570). In the triggering routine, the triggering current $I_{\Delta trigger}$ and the triggering time $t_{\Delta trigger}$ are determined according to specific applications and standards.

If the effective value $I_{\Delta eff}$ of the fault current $I_f$ does not satisfy relationship (12), the controller 30 may output a message to inform a user or operator that the detection system has not been activated and may store the effective value $I_{\Delta eff}$ of the fault current $I_f$ (step S580). Then, the controller 30 proceeds to step S190 (FIG. 2) to update the measured values relating to the fault current $I_f$ and performs the remaining steps shown in FIG. 2 (step S590).

Figure 6:
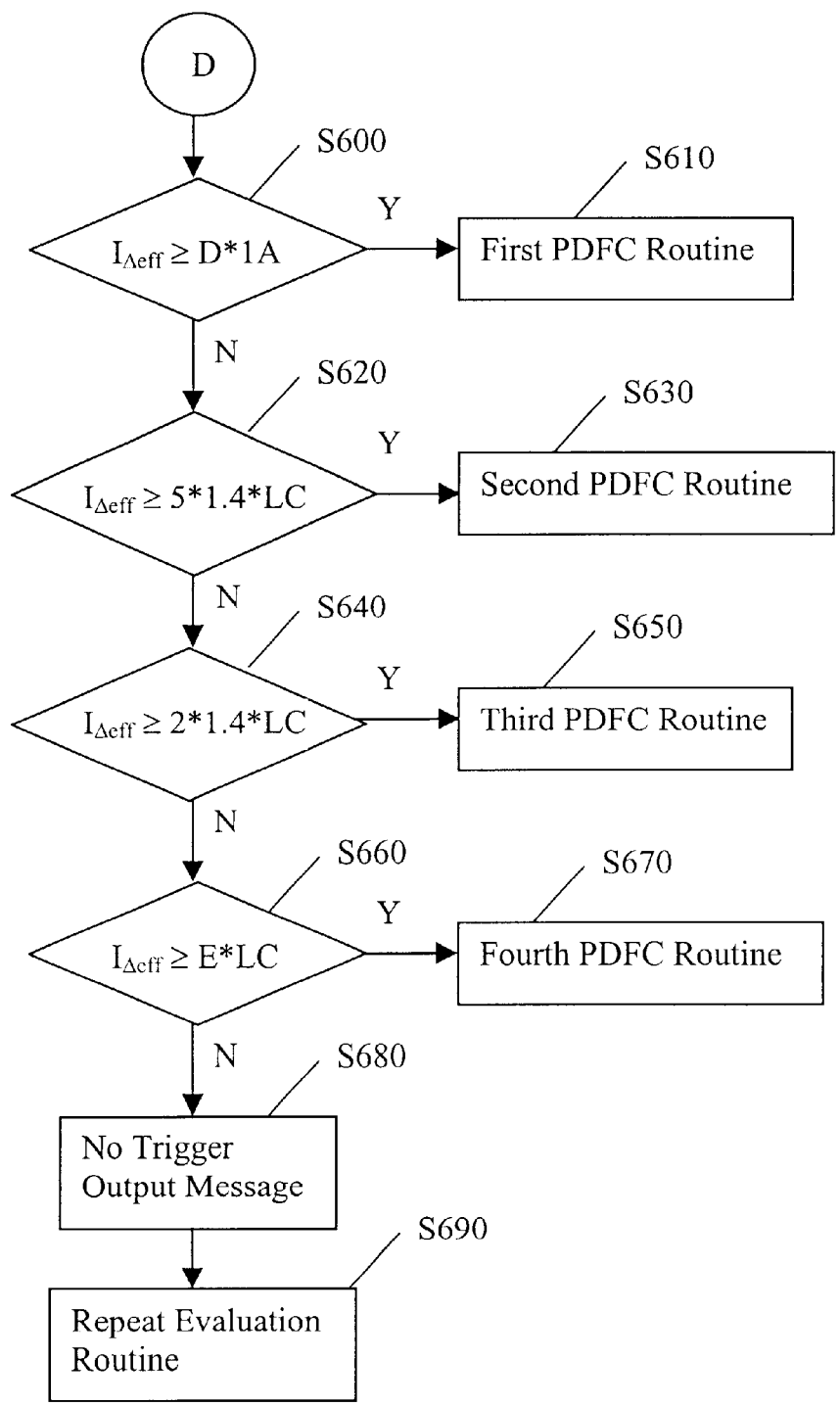
FIG. 6 is a flow chart of an illustrative process that evaluates a pulsating direct fault current and that is performed by the fault current detection system of the illustrative embodiment of the present invention.

If the controller 30 determines that the fault current is not a smooth direct fault current in step S320 (FIG. 3), the fault current is determined to be a pulsating direct fault current, and the pulsating direct fault current triggering routine shown in FIG. 6 is executed (step S340). As shown in FIG.

6, the controller 30 determines if the effective. value $I_{\Delta eff}$ of the fault current $I_f$ satisfies the following relationship:

$$I_{\Delta eff} \geq D*1 \text{ Ampere} \tag{13}$$

where D is a parameter that has a value between 1 and 500 (step S600). The value of the parameter D is determined based on the specific application and characteristics of the fault current detection circuit. If the effective value $I_{\Delta eff}$ of the fault current $I_f$ satisfies relationship (13), the controller 30 outputs a control signal to prevent the supply of power to the electric device according to a first pulsating direct fault current ("PDFC") triggering routine (i.e. a "500 A" PDFC triggering routine) (step S610). In the triggering routine, the triggering current $I_{\Delta trigger}$ and the triggering time $t_{\Delta trigger}$ are determined according to specific applications and standards.

On the other hand, if the effective value $I_{\Delta eff}$ of the fault current $I_f$ does not satisfy relationship (13), the controller 30 determines if the effective value $I_{\Delta eff}$ satisfies the following relationship:

$$I_{\Delta eff} \geq 5*1.4*LC \tag{14}$$

(step S620). If the effective value $I_{\Delta eff}$ of the fault current $I_f$ satisfies relationship (14), the controller 30 outputs a control signal to prevent the supply of power to the electric device according to a second PDFC triggering routine (i.e. a "5 * 1.4 * LC" PDFC triggering routine) (step S630). In the triggering routine, the triggering current $I_{\Delta trigger}$ and the triggering time $t_{\Delta trigger}$ are determined according to specific applications and standards.

However, if the effective value $I_{\Delta eff}$ of the fault current $I_f$ does not satisfy relationship (14), the controller 30 determines if the effective value $I_{\Delta eff}$ satisfies the following relationship:

$$I_{\Delta eff} \geq 2*1.4*LC \tag{15}$$

(step S640). If the effective value $I_{\Delta eff}$ of the fault current $I_f$ satisfies relationship (15), the controller 30 outputs a control signal to prevent the supply of power to the electric device according to a third PDFC triggering routine (i.e. a "2 * 1.4 * LC" PDFC triggering routine) (step S650). In the triggering routine, the triggering current $I_{\Delta trigger}$ and the triggering time $t_{\Delta trigger}$ are determined according to specific applications and standards.

If the effective value $I_{\Delta eff}$ of the fault current $I_f$ does not satisfy relationship (15), the controller 30 determines if the effective value $I_{\Delta eff}$ satisfies the following relationship:

$$I_{\Delta eff} \geq E*LC \tag{16}$$

where the parameter E equals a value between 0.5 and 1.4 based on the particular operating conditions and features of the fault current detection system (step S660). If the effective value $I_{\Delta eff}$ satisfies relationship (16), the controller 30 outputs a control signal to prevent the supply of power to the electric device according to a fourth PDFC triggering routine (i.e. a "1 * LC" PDFC triggering routine) (step S670). In the triggering routine, the triggering current $I_{\Delta trigger}$ and the triggering time $t_{\Delta trigger}$ are determined according to the specific applications and standards.

If the effective value $I_{\Delta eff}$ of the fault current $I_f$ does not satisfy relationship (16), the controller 30 may output a message to inform a user or operator that the fault current detection system has not been activated and may store the effective value $I_{\Delta eff}$ of the fault current $I_f$ (step S680). Then, the controller 30 proceeds to step S190 (FIG. 2) to update the measured values relating to the fault current $I_f$ and performs the remaining steps shown in FIG. 2 (step S690).

As described above, the controller 30 determines the type of fault current $I_f$ and the severity of the fault current $I_f$ via software. Accordingly, the controller 30 can be mass-produced from relatively simple and inexpensive hardware. In addition, since the various parameters used in the routines are stored in software, they can easily be modified and changed by a user. As a result, the controller 30 can be easily modified so that it is compatible with many different electric devices operating under many different types of operating conditions.

Also, as described above, the controller 30 stores various triggering times $t_{\Delta trigger}$ and uses them in the software routines to ensure that the fault current detection system is not activated to block the input signal that is input to the electric device unnecessarily. For instance, if brief, transient leakage currents are generated and are supplied to the electric device for a relatively short period of time, the controller 30 does not trigger the protection circuit because the duration of the leakage current is less than the various trigger times $t_{\Delta trigger}$. As a result, the operation of the electric device is not affected or interrupted, and the operational efficiency of the electric device is substantially enhanced.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For instance, the above examples refer to parameters that have specific values or ranges of values and refer to procedures that detect specific types of fault currents. However, the present invention is not limited to such parameters having such values and is not limited to the detection of such fault currents. Therefore, the present invention is not intended to be limited to the embodiments described herein but is to be accorded the widest scope as defined by the limitations of the claims and equivalents thereof.

What is claimed is:

1. A ground fault current detection software program contained in a computer readable medium, wherein the ground fault current detection software program includes instructions to perform a routine comprising:

(a) determining predetermined characteristics of said ground fault current based on a detection signal corresponding to said ground fault current;

(b) identifying said ground fault current as a first type of ground fault current when at least one of said predetermined characteristics has a first predetermined value;

(c) setting a trigger current to a first trigger current value when said ground fault current is identified as said first type of ground fault current; and (d) outputting a control signal when said ground fault current and said trigger current have a predetermined relationship.

2. The ground fault current detection software program as claimed in claim 1, wherein the routine further comprises:

(e) identifying said ground fault current as a second type of ground fault current when at least one of said predetermined characteristics has a second predetermined value; and (f) setting said trigger current to a second trigger current value when said ground fault current is identified as said second type of ground fault current.

3. The ground fault current detection software program as claimed in claim 1, wherein said first type of ground fault current is one of a high frequency fault current, an alternating fault current a smooth direct fault current, and a pulsating direct fault current.

4. The ground fault current detection software program as claimed in claim 1, wherein step (b) comprises:
   (b1) determining if a frequency of said ground fault current is greater than or equal to a first predetermined frequency; and
   (b2) identifying said ground fault current as a high frequency fault current when said frequency of said ground fault current is greater than or equal to said first predetermined frequency.

5. The ground fault current detection software program as claimed in claim 4, wherein said step (b2) further comprises:
   (b2a) identifying said high frequency fault current as fibrillation producing fault current if said frequency of said ground fault current is greater than or equal to said first predetermined frequency and is less than a second predetermined frequency; and
   (b2b) identifying said high frequency fault current as a fire producing fault current if said frequency of said ground fault current is greater than or equal to said second predetermined frequency, and
   wherein said step (c) comprises:
      (c1) setting said trigger current to said first trigger current value when said ground fault current is identified as said fibrillation producing fault current; and
      (c2) setting said trigger current to a second trigger current value when said ground fault current is identified as said fire producing fault current.

6. The ground fault current detection software program as claimed in claim 1, wherein said step (c) comprises:
   (c1) determining if said first type of ground fault current has a fault current value that is greater than or equal to a first predetermined fault current value; and
   (c2) setting said trigger current to said first trigger current value when said fault current value is greater than or equal to said first predetermined fault current value.

7. The ground fault current detection software program as claimed in claim 6, wherein said step (c) further comprises:
   (c3) when said fault current value is less than said first predetermined fault current value, determining if said fault current value is greater than or equal to a second predetermined fault current value; and
   (c4) setting said trigger current to a second trigger current value when said fault current value is less than said first predetermined fault current value and is greater than or equal to said second predetermined fault current value.

8. The ground fault current detection software program as claimed in claim 1, wherein the routine further comprises:
   (e) setting a trigger time to a first trigger time value when said ground fault current is identified as said first type of ground fault current,
   wherein said step (d) comprises:
      (d1) outputting said control signal to a protection device when said ground fault current is greater than or equal to said trigger current and when said ground fault current has been greater than or equal to said trigger current for longer than said trigger time.

9. The ground fault current detection software program as claimed in claim 2, wherein the routine further comprises:
   (g) setting a trigger time to a first trigger time value when said ground fault current is identified as said first type of ground fault current; and
   (h) setting said trigger time to a second trigger time value when said ground fault current is identified as said second type of ground fault current, and
   wherein said step (d) comprises:
      (d1) outputting said control signal to a protection device when said ground fault current is greater than or equal to said trigger current and when said ground fault current has been greater than or equal to said trigger current for longer than said trigger time.

10. The ground fault current detection software program as claimed in claim 1,
   wherein said step (b) comprises:
   (b1) identifying said ground fault current as said first type of ground fault current when a frequency of said ground fault current is greater than a first predetermined frequency and less than a second predetermined frequency;
   (b2) identifying said ground fault current as a second type of ground fault current when said frequency of said ground fault current is greater than said second predetermined frequency; and
   (b3) identifying said ground fault current as said a third type of ground fault current when said frequency of said ground fault current is less than said first predetermined frequency, and
   wherein said step (c) comprises:
      (c1) setting said trigger current to said first trigger current value when said ground fault current is identified as said first type of ground fault current, wherein said first trigger current value is based on a value of a first portion of a first limit curve that is located between said first predetermined frequency and said second predetermined frequency;
      (c2) setting said trigger current to a second trigger current value when said ground fault current is identified as said second type of ground fault current, wherein said second trigger current value is based on a value of a first portion of a second limit curve that is located above said second predetermined frequency; and
      (c3) setting said trigger current to a third trigger current value when said ground fault current is identified as said third type of ground fault current, wherein said third trigger current value is based on a value of a second portion of said first limit curve that is located below said first predetermined frequency.

11. The ground fault current detection software program as claimed in claim 10, wherein said first limit curve is a ventricular fibrillation limit curve and said second limit curve is a fire prevention limit curve.

12. The ground fault current detection software program as claimed in claim 10, further comprising:
   (e) when said ground fault current is identified as said third type of ground fault current, setting a trigger time equal to a first trigger time value based on an effective value of said ground fault current,
   wherein said step (d) comprises:
      (d1) outputting said control signal when said ground fault current is greater than or equal to said trigger current and when said ground fault current has been greater than or equal to said trigger current for longer than said trigger time.

13. The ground fault current detection software program as claimed in claim 12, further comprising:
   (f) when said ground fault current is identified as said second type of ground fault current, setting said trigger time equal to a second trigger time value, wherein said second trigger time value is based on a first predetermined trigger time value; and (g) when said ground fault current is identified as said first type of ground fault current, setting said trigger time equal to a third trigger time value, wherein said third trigger time value is based on a second predetermined trigger time value.

14. The ground fault current detection software program as claimed in claim 1, wherein said step (c) comprises:

(c1) determining if said first type of ground fault current has a fault current value that is greater than or equal to a first predetermined fault current value;

(c2) setting said trigger current to said first trigger current value when said fault current value is greater than or equal to said first predetermined fault current value;

(c3) when said fault current value is less than said first predetermined fault current value, determining if said fault current value is greater than or equal to a second predetermined fault current value;

(c4) setting said trigger current to a second trigger current value when said fault current value is greater than or equal to said second predetermined fault current value;

(c5) when said fault current value is less than said second predetermined fault current value, determining if said fault current value is greater than or equal to a third predetermined fault current value;

(c6) setting said trigger current to a third trigger current value when said fault current value is greater than or equal to said third predetermined fault current value;

(c7) when said ground fault current is less than said third predetermined fault current value, determining if said fault current value is greater than or equal to a fourth predetermined fault current value, and (c8) setting said trigger current to a fourth trigger current value when said fault current value is greater than or equal to said fourth predetermined fault current value.

15. The ground fault detection software program as claimed in claim 14, wherein said step (c) further comprises:

(c9) when said fault current value is less than said fourth predetermined fault current value, said control signal is not output; and (c10) when said fault current value is less than said fourth predetermined fault current value, repeating said step (a).

16. The ground fault current detection software program as claimed in claim 8, wherein said step (e) further comprises:

(e1) setting said trigger time to said first trigger time value when said ground fault current is greater than or equal to a first predetermined fault current value;

(e2) setting said trigger time to a second trigger time value when said ground fault current is greater than or equal to a second predetermined fault current value and less than said first predetermined fault current value;

(e3) setting said trigger time to a third trigger time value when said ground fault current is greater than or equal to a third predetermined fault current value and less than said second predetermined fault current value; and (e4) setting said trigger time to a fourth trigger time value when said ground fault current is greater than or equal to a fourth predetermined fault current value and less than said third predetermined fault current value.

17. A ground fault current detection software program contained in a computer readable medium, wherein the ground fault current detection software program includes instructions to perform a routine comprising:

(a) determining at least a frequency of said ground fault current based on a detection signal corresponding to said ground fault current;

(b) determining if said frequency of said ground fault current is greater than a first predetermined frequency;

(c) identifying said ground fault current as a high frequency fault current when said frequency is greater than or equal to said first predetermined frequency; and (d) when said frequency is less than said first predetermined frequency, identifying said ground fault current as a waveform fault current.

18. The ground fault current detection software program as claimed in claim 17, wherein the routine further comprises:

(e) setting a trigger fault current to a first trigger fault current value when said ground fault current is identified as said high frequency fault current;

(f) setting said trigger fault current to a second trigger fault current value when said ground fault current is identified as said waveform fault current; and (g) outputting a control signal when said ground fault current is greater than or equal to said trigger fault current.

19. The ground fault current detection software program as claimed in claim 18, wherein said step (g) comprises:

(g1) outputting said control signal to a protection device when said ground fault current is greater than or equal to said trigger fault current and when said ground fault current has been greater than or equal to said trigger fault current for longer than a trigger time.

20. The ground fault current detection software program as claimed in claim 18, wherein said step (c) comprises:

(c1) determining if said frequency of said ground fault current is less than a second predetermined frequency;

(c2) identifying said ground fault current as said high frequency fault current when said frequency of said ground fault current is greater than or equal to said first predetermined frequency and is less than said second predetermined frequency, wherein said high frequency fault current is a fibrillation producing fault current; and (c3) identifying said ground fault current as a fire producing fault current when said frequency of said ground fault current is greater than said second predetermined frequency, and wherein said step (e) comprises:

(e1) setting said trigger fault current to said first trigger fault current value when said ground fault current is identified as said fibrillation producing fault current; and (e2) setting said trigger fault current to a third trigger fault current value when said ground fault current is identified as said fire producing fault current.

21. The ground fault current detection software program as claimed in claim 18, wherein said step (f) comprises:

(f1) determining if said ground fault current is greater than or equal to a first predetermined fault current value; and (f2) setting said trigger fault current to said second trigger fault current value when said ground fault current is greater than or equal to said first predetermined fault current value.

22. The ground fault current detection software program as claimed in claim 21, wherein said step (f) further comprises:

(f3) determining if said ground fault current is greater than or equal to a second predetermined fault current value and less than said first predetermined fault current value; and (f4) setting said trigger fault current to a third trigger fault current value when said ground fault current is greater than or equal to said second predetermined fault current value and less than said first predetermined fault current value.

23. The ground fault current detection software program as claimed in claim 17, wherein said waveform fault current is one of an alternating fault current, a smooth direct fault current, and a pulsating direct fault current.

24. The ground fault current detection software program as claimed in claim 18, wherein said step (d) comprises:

(d1) determining if said ground fault current is a first waveform fault current;

(d2) when said ground fault current is not said first waveform fault current, determining if said ground fault current is a second waveform fault current.

25. The ground fault current detection software program as claimed in claim 24, wherein said step (f) comprises:

(f1) when said ground fault current is said first waveform fault current, determining if said ground fault current is greater than or equal to a first predetermined fault current value;

(f2) when said ground fault current is said first waveform fault current, setting said trigger fault current to said second trigger fault current value when said ground fault current is greater than or equal to said first predetermined fault current value;

(f3) when said ground fault current is said second waveform fault current, determining if said ground fault current is greater than or equal to a second predetermined fault current value; and (f4) when said ground fault current is said second waveform fault current, setting said trigger fault current to a third trigger fault current value when said ground fault current is greater than or equal to said second predetermined fault current value.

26. The ground fault current detection software program as claimed in claim 18, wherein the routine further comprises:

(h) setting a trigger time to a first trigger time value when said ground fault current is identified as said high frequency fault current; and (i) setting said trigger time to a second trigger time value when said ground fault current is identified as said waveform fault current, wherein said step (g) comprises:

(g1) outputting said control signal to a protection device when said ground fault current is greater than or equal to said trigger fault current and when said ground fault current has been greater than or equal to said trigger fault current for longer than said trigger time.

27. The ground fault current detection software program as claimed in claim 17, wherein said step (d) comprises:

(d1) when said ground fault current is identified as said waveform fault current, determining if said waveform fault current has a fault current value that is greater than or equal to a first predetermined fault current value;

(d2) setting a trigger fault current to a first trigger fault current value when said fault current value is greater than or equal to said first predetermined fault current value;

(d3) when said fault current value is less than said first predetermined fault current value, determining if said fault current value is greater than or equal to a second predetermined fault current value;

(d4) setting said trigger fault current to a second trigger fault current value when said fault current value is greater than or equal to said second predetermined fault current value;

(d5) when said fault current value is less than said second predetermined fault current value, determining if said fault current value is greater than or equal to a third predetermined fault current value;

(d6) setting said trigger fault current to a third trigger fault current value when said fault current value is greater than or equal to said third predetermined fault current value;

(d7) when said fault current value is less than said third fault predetermined current value, determining if said fault current value is greater than or equal to a fourth predetermined fault current value;

(d8) setting said trigger fault current to a fourth trigger fault current value when said fault current value is greater than or equal to said fourth predetermined fault current value.

28. The ground fault detection software program as claimed in claim 27, wherein said step (d) further comprises:

(d9) when said fault current value is less than said fourth predetermined fault current value, repeating said step (a).

29. The ground fault detection software program as claimed in claim 20, wherein said step (g) comprises:

(g1) when said ground fault current is identified as said fibrillation producing fault current, outputting said control signal when said fibrillation producing fault current is greater than said trigger fault current; and (g2) when said ground fault current is identified as said fibrillation producing fault current, refraining from outputting said control signal when said fibrillation producing fault current is less than said trigger fault current and repeating said step (a).

30. The ground fault detection software program as claimed in claim 20, wherein said step (g) comprises:

(g1) when said ground fault current is identified as said fire producing fault current, outputting said control signal when said fire producing fault current is greater than said trigger fault current; and (g2) when said ground fault current is identified as said fire producing fault current, refraining from outputting said control signal when said fire producing fault current is less than said trigger fault current and repeating said step (a).

31. The ground fault current detection software program as claimed in claim 18, wherein said step (f) further comprises:

(f1) when said ground fault current is identified as said waveform fault current, determining if a fault current value of said ground fault current is greater than or equal to a first predetermined fault current value;

(f2) setting said trigger fault current to said second trigger fault current value when said fault current value is greater than or equal to said first predetermined fault current value;

(f3) when said fault current value is less than said first predetermined fault current value, determining if said fault current value is greater than or equal to a second predetermined fault current value;

(f4) setting said trigger fault current to a third trigger fault current value when said fault current value is greater than or equal to said second predetermined fault current value;

(f5) when said fault current value is less than said second fault predetermined current value, determining if said fault current value is greater than or equal to a third predetermined fault current value;

(f6) setting said trigger fault current to a fourth trigger fault current value when said fault current value is greater than or equal to said third predetermined fault current value;

(f7) when said fault current value is less than said third predetermined fault current value, determining if said fault current value is greater than or equal to a fourth predetermined fault current value; and (f8) setting said trigger fault current to a fifth trigger fault current value when said fault current value is greater than or equal to said fourth predetermined fault current value.

32. The ground fault current detection software program as claimed in claim 31, wherein said step (f) further comprises:

(f9) when said fault current value is less than said fourth predetermined fault current value, refraining from outputting said control signal; and (f10) repeating step (a).

33. A ground fault current detection system that detects a ground fault current generated on a conductive path supplying power to an electric device and that prevents the ground fault current from being supplied to the electric device, wherein the ground fault current detection system comprises:

a detector that detects a ground fault current generated on said conductive path and outputs a corresponding detection signal;

a switch that is provided in said conductive path that selectively isolates said electric device from said conductive path; and a controller that inputs said detection signal and determines predetermined characteristics of said ground fault current based on said detection signal, wherein said controller executes a software routine:

(a) to identify said ground fault current as a first type of ground fault current when at least one of said predetermined characteristics has a first predetermined value, (b) to set a trigger current to a first trigger current value when said ground fault current is identified as said first type of ground fault current, and (c) to output a control signal to said switch to instruct said switch to isolate said electric device from said conductive network when said ground fault current and said trigger current have a predetermined relationship.

34. The ground fault current detection system as claimed in claim 33, wherein the controller identifies said ground fault current as a second type of ground fault current when at least one of said predetermined characteristics has a second predetermined value, and wherein said controller sets said trigger current to a second trigger current value when said ground fault current is identified as said second type of ground fault current.

35. The ground fault current detection system as claimed in claim 33, wherein said first type of ground fault current is one of a high frequency fault current, an alternating fault current, a smooth direct fault current, and a pulsating direct fault current.

36. The ground fault current detection system as claimed in claim 33, wherein said first type of ground fault current is a high frequency fault current and said controller identifies said ground fault current as said first type of ground fault current by:

determining if a frequency of said ground fault current is greater than or equal to a first predetermined frequency; and identifying said ground fault current as said high frequency fault current when said frequency of said ground fault current is greater than or equal to said first predetermined frequency.

37. The ground fault current detection system as claimed in claim 36, wherein said controller identifies said high frequency fault current as fibrillation producing fault current if said frequency of said ground fault current is greater than or equal to said first predetermined frequency and is less than a second predetermined frequency, wherein said controller identifies said high frequency fault current as a fire producing fault current if said frequency of said ground fault current is greater than or equal to said second predetermined frequency, wherein said controller sets said trigger current to said first trigger current value when said ground fault current is identified as said fibrillation producing fault current, and wherein said controller sets said trigger current to a second trigger current value when said ground fault current is identified as said fire producing fault current.

38. The ground fault current detection system as claimed in claim 33, wherein said controller determines if said first type of ground fault current has a fault current value that is greater than or equal to a first predetermined current value, wherein said controller sets said trigger current to said first trigger current value when said fault current value is greater than or equal to said first predetermined current value.

39. The ground fault current detection system as claimed in claim 38, wherein when said fault current value is less than said first predetermined current value, said controller determines if said fault current value is greater than or equal to a second predetermined current value, and wherein said controller sets said trigger current to a second trigger current value when said fault current value is less than said first predetermined current value and is greater than or equal to said second predetermined current value.

40. The ground fault current detection system as claimed in claim 38, wherein said first type of ground fault current is one of an alternating fault current, a smooth direct fault current, and a pulsating direct fault current.

41. The ground fault current detection system as claimed in claim 33, wherein said controller sets a trigger time to a first trigger time value when said ground fault current is identified as said first type of ground fault current, and wherein said controller outputs said control signal to said switch when said ground fault current is greater than or equal to said trigger current and when said ground fault current has been greater than or equal to said trigger current for longer than said trigger time.

42. The ground fault current detection system as claimed in claim 34, wherein the controller sets a trigger time to a first trigger time value when said ground fault current is identified as said first type of ground fault current, wherein said controller sets said trigger time to a second trigger time value when said ground fault current is identified as said second type of ground fault current, and wherein said controller outputs said control signal to said switch when said ground fault current is greater than or equal to said trigger current and when said ground fault current has been greater than or equal to said trigger current for longer than said trigger time.

43. A fault current detection system that detects a fault current generated on a conductive path supplying power to an electric device and that prevents the fault current from being supplied to the electric device, wherein the fault current detection system comprises:

a detector that detects a fault current generated on said conductive path and outputs a corresponding detection signal;

a switch that is provided in said conductive path that selectively isolates said electric device from said conductive path; and a controller that inputs said detection signal and determines at least a frequency of said fault current based on said detection signal, wherein said controller determines if said frequency of said fault current is greater than a first predetermined frequency, wherein said controller identifies said fault current as a high frequency fault current when said frequency is greater than of equal to said first predetermined frequency, wherein, when said frequency is less than said first predetermined frequency, said controller identifies said fault current as a waveform fault current, wherein said controller sats a trigger current to a first trigger current value when said fault current is identified as said high frequency fault current, wherein said controller sets said trigger current to a second trigger current value when said fault current is identified as said waveform fault current, and wherein said controller outputs a control signal to said switch when said fault current is greater than or equal to said trigger current.

44. The fault current detection system as claimed in claim 43, wherein said controller determines if said frequency of said fault current is greater than or equal to said first predetermined frequency and is less than a second predetermined frequency;

wherein said controller identifies said fault current as said high frequency fault current when said frequency of said fault current is greater than or equal to said first predetermined frequency and is less than said second predetermined frequency, wherein said high frequency fault current is a fibrillation producing fault current, wherein said controller identifies said fault current as a fire producing fault current when said frequency of said fault current is greater than said second predetermined frequency, wherein said controller sets said trigger current to said first trigger current value when said fault current is identified as said fibrillation producing fault current, and wherein said controller sets said trigger current to a third trigger current value when said fault current is identified as said fire producing fault current.

45. The fault current detection system as claimed in claim 43, wherein said controller determines a fault current value of said waveform fault current based on said detection signal, wherein said controller determines if said fault current value of said waveform fault current is greater than or equal to a first predetermined current value, and wherein said controller sets said trigger current to said second trigger current value when said fault current value of said waveform fault current is greater than or equal to said first predetermined current value.

46. The fault current detection system as claimed in claim 45, wherein said controller determines if said fault current value of said waveform fault current is greater than or equal to a second predetermined current value and less than said first predetermined current value, and wherein said controller sets said trigger current to a third trigger current value when said fault current value of said waveform fault current is greater than or equal to said second predetermined current value and less than said first predetermined current value.

47. The fault current detection system as claimed in claim 43, wherein said waveform fault current is one of an alternating fault current, a smooth direct fault current, and a pulsating direct fault current.

48. The fault current detection system as claimed in claim 43, wherein said controller determines if said waveform fault current is a first waveform fault current, wherein, when said fault current is not said first waveform fault current, said controller determines if said fault current is a second waveform fault current.

49. The fault current detection software program as claimed in claim 48, wherein said controller determines a fault current value of said waveform fault current based on said detection signal, wherein, when said waveform fault current is said first waveform fault current, said controller determines if said fault current value of said waveform fault current is greater than or equal to a first predetermined current value, wherein, when said waveform fault current is said first waveform fault current, said controller sets said trigger current to said second trigger current value when said fault current value of said waveform fault current is greater than or equal to said first predetermined current value, wherein, when said waveform fault current is said second waveform fault current, said controller determines if said fault current value of said waveform fault current is greater than or equal to a second predetermined current value, and wherein, when said waveform fault current is said second waveform fault current, said controller sets said trigger current to a third trigger current value when said fault current value of said waveform fault current is greater than or equal to said second predetermined current value.

50. The fault current detection system as claimed in claim 43, wherein the controller sets a trigger time to a first trigger time value when said fault current is identified as said high frequency fault current, wherein said controller sets said trigger time to a second trigger time value when said fault current is identified as said waveform fault current, wherein said controller outputs said control signal to said switch when said fault current is greater than or equal to said trigger current and when said fault current has been greater than or equal to said trigger current for longer than said trigger time.

51. A fault current detection software program contained in a computer readable medium, wherein the fault current detection software program includes instructions to perform a routine comprising:
(a) determining predetermined characteristics of said fault current based on a detection signal corresponding to said fault current;
(b) identifying said fault current as a first type of fault current when at least one of said predetermined characteristics has a first predetermined value;
(c) setting a trigger current to a first trigger current value when said fault current is identified as said first type of fault current; and
(d) outputting a control signal when said fault current and said trigger current have a predetermined relationship; wherein step (b) comprises:
(b1) determining if a frequency of said fault current is greater than or equal to a first predetermined frequency;
(b2) identifying said fault current as a high frequency fault current when said frequency of said fault current is greater than or equal to said first predetermined frequency;
(b3) identifying said high frequency fault current as fibrillation producing fault current if said frequency of said fault current is greater than or equal to said first predetermined frequency and is less than a second predetermined frequency; and
(b4) identifying said high frequency fault current as a fire producing fault current if said frequency of said fault current is greater than or equal to said second predetermined frequency, and
wherein said step (c) comprises:
(c1) setting said trigger current to said first trigger current value when said fault current is identified as said fibrillation producing fault current; and
(c2) setting said trigger current to a second trigger current value when said fault current is identified as said fire producing fault current.

52. A fault current detection software program contained in a computer readable medium, wherein the fault current detection software program includes instructions to perform a routine comprising:
(a) determining predetermined characteristics of said fault current based on a detection signal corresponding to said fault current;
(b) identifying said fault current as a first type of fault current when at least one of said predetermined characteristics has a first predetermined value;
(c) setting a trigger current to a first trigger current value when said fault current is identified as said first type of fault current; and
(d) outputting a control signal when said fault current and said trigger current have a predetermined relationship; wherein said step (b) comprises:
(b1) identifying said fault current as said first type of fault current when a frequency of said fault current is greater than a first predetermined frequency and less than a second predetermined frequency;
(b2) identifying said fault current as a second type of fault current when said frequency of said fault current is greater than said second predetermined frequency; and
(b3) identifying said fault current as said a third type of fault current when said frequency of said fault current is less than said first predetermined frequency, and wherein said step (c) comprises:
(c1) setting said trigger current to said first trigger current value when said fault current is identified as said first type of fault current, wherein said first trigger current value is based on a value of a first portion of a first limit curve that is located between said first predetermined frequency and said second predetermined frequency;
(c2) setting said trigger current to a second trigger current value when said fault current is identified as said second type of fault current, wherein said second trigger current value is based on a value of a first portion of a second limit curve that is located above said second predetermined frequency; and
(c3) setting said trigger current to a third trigger current value when said fault current is identified as said third type of fault current, wherein said third trigger current value is based on a value of a second portion of said first limit curve that is located below said first predetermined frequency.

53. A fault current detection software program contained in a computer readable medium, wherein the fault current detection software program includes instructions to perform a routine comprising:
(a) determining at least a frequency of said fault current based on a detection signal corresponding to said fault current;
(b) determining if said frequency of said fault current is greater than a first predetermined frequency;
(c) identifying said fault current as a high frequency fault current when said frequency is greater than or equal to said first predetermined frequency;
(d) when said frequency is less than said first predetermined frequency, identifying said fault current as a waveform fault current;
(e) setting a trigger fault current to a first trigger fault current value when said fault current is identified as said high frequency fault current;
(f) setting said trigger fault current to a second trigger fault current value when said fault current is identified as said waveform fault current; and
(g) outputting a control signal when said fault current is greater than or equal to said trigger fault current.

54. A fault current detection system that detects a fault current generated on a conductive path supplying power to an electric device and that prevents the fault current from being supplied to the electric device, wherein the fault current detection system comprises:
a detector that detects a fault current generated on said conductive path and outputs a corresponding detection signal;
a switch that is provided in said conductive path that selectively isolates said electric device from said conductive path; and
a controller that inputs said detection signal and determines predetermined characteristics of said fault current based on said detection signal, wherein said controller executes a software routine:
  (a) to identify said fault current as a first type of fault current when at least one of said predetermined value,
  (b) to set a trigger current value when said fault current is identified as said first type of fault current, and
  (c) to output a control signal to said switch to instruct said switch to isolate said electric device from said conductive network when said fault current and said trigger current have a predetermined relationship;

wherein said controller sets a trigger time to a first trigger time value when said fault current is identified as said first type of fault current, and wherein said controller outputs said control signal to said switch when said fault is greater than or equal to said trigger current and when said fault current has been greater than or equal to said trigger current for longer than said trigger time.

* * * * *

UNITED STATES PATENT AND TRADEMARK OFFICE
CERTIFICATE OF CORRECTION

PATENT NO.   : 6,658,360 B1
DATED        : December 2, 2003
INVENTOR(S)  : Gies et al.

It is certified that error appears in the above-identified patent and that said Letters Patent is hereby corrected as shown below:

Title page,
Item [*] Notice, delete the phrase "by 59 days" and insert -- by 144 days --

Signed and Sealed this

Fifth Day of October, 2004

JON W. DUDAS
*Director of the United States Patent and Trademark Office*